(12) United States Patent
Drabarek et al.

(10) Patent No.: US 7,522,793 B2
(45) Date of Patent: Apr. 21, 2009

(54) COUPLING DEVICE FOR A LIGHT GUIDE

(75) Inventors: Pawel Drabarek, Tiefenbronn (DE);
Jochen Straehle, Weissach (DE); Stefan Franz, Jena (DE); Matthias Fleischer, Ostfildern (DE); Ralf Kochendoerfer, Leonberg (DE); David Rychtarik, Stuttgart (DE); Jan Fischer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/580,628

(22) Filed: Oct. 12, 2006

(65) Prior Publication Data

US 2007/0122079 A1     May 31, 2007

(30) Foreign Application Priority Data

Oct. 20, 2005    (DE) .................... 10 2005 050 274

(51) Int. Cl.
*G02B 6/26*     (2006.01)
*G02B 6/38*     (2006.01)

(52) U.S. Cl. ........................ 385/52; 385/57

(58) Field of Classification Search ................ 385/52
See application file for complete search history.

(56) References Cited

U.S. PATENT DOCUMENTS

| 4,329,017 | A | * | 5/1982 | Kapany et al. | 385/22 |
| 4,641,915 | A | * | 2/1987 | Asakawa et al. | 385/26 |
| 5,568,578 | A | * | 10/1996 | Ames | 385/34 |

FOREIGN PATENT DOCUMENTS

DE     198 08 273     9/1999

* cited by examiner

*Primary Examiner*—Charlie Peng
(74) *Attorney, Agent, or Firm*—Kenyon & Kenyon LLP

(57) ABSTRACT

A device for coupling beam guides of optical systems for unidirectional or bidirectional transmission of beams via a beam transition between the optical systems is provided, the device having a connecting device and mechanical centering means. The connecting device provides a magnetic coupling for implementing a coupling connection in a coupling area. The centering means are situated opposite one another on the optical systems and coupled in such a way to cause the beam guides to self-center due to the attraction caused by the magnetic forces.

9 Claims, 2 Drawing Sheets

COUPLING DEVICE FOR A LIGHT GUIDE

FIELD OF THE INVENTION

The present invention relates to a device for coupling beam guides of optical systems for unidirectional or bidirectional transmission of beams via a beam transition between the optical systems.

BACKGROUND INFORMATION

Coupled optical systems are used in many forms, for example, in interferometric measuring devices, in which a beam is guided from one optical system of the measuring device into another optical system. The beam transition may take place as a free beam or as a beam guided in an optical waveguide.

Published German patent document DE 198 08 273 describes an interferometric measuring device for determining the profile of rough surfaces, a spatially coherent beam generating unit being provided, which emits a briefly short-coherent and broadband radiation, and a separation being performed in a section having the components of a modulation interferometer and the components of a measuring probe, and the measuring probe being coupled to the modulation interferometer via a light guide fiber system and being usable remotely from the modulation interferometer.

Such interferometric measuring devices are used in profile measuring machines. The measuring probe is integrated into an optical sensing arm, which is replaceably and mechanically connected to a measuring machine, for example, via a magnetic coupling. A modulation interferometer as a component of an optical measuring device is also connected to the measuring machine. The optical measuring device is optically connected to the measuring probe via optical waveguides. An optical waveguide runs freely next to the sensing arm as an optical connection between the measuring machine and the measuring probe. The optical waveguide is optically and mechanically coupled to the measuring machine via a plug-in connection.

The disadvantage of this design is that, due to the presence of the plug-in connection of the optical waveguide in addition to the magnetic coupling, the measuring probe cannot be automatically replaced. Manual replacement is complicated and time-consuming. When the sensing arm is swiveled, parasitic forces are transmitted to the sensing arm through the freely running optical waveguide; in addition, the optical waveguide may be easily damaged during operation or when the measuring probe is replaced. The bending of the optical fibers in the optical waveguide and/or vibrations of the fibers relative to the measuring probe may have an optical effect on the measurement result.

An object of the present invention is to provide a device for coupling beam guides of optical systems, which avoids the above-mentioned disadvantages and makes an optical and mechanical coupling of the optical systems that is detachable in a simple manner possible.

SUMMARY OF THE INVENTION

The device for coupling beam guides in accordance with the present invention includes a connecting device and a mechanical centering means. The connecting device has a magnetic coupling in a coupling area for implementing a coupling connection, and the centering means are designed and situated on the optical systems to be coupled and situated opposite one another in such a way that they cause the beam guides to self-center when attracted to one another by the magnetic forces. The connecting device thus implements both the mechanical connection between the optical systems and their optical connection. The magnetic coupling allows the optical systems to be easily disconnected and connected. The optical systems may thus be separated in a single step, namely the disconnection of the magnetic connection. No additional assembly steps such as the separation of an additional optical connection are needed, which makes automatic replacement of one of the optical systems possible. This is relevant in particular in coupled optical systems in which one of the systems represents an optical measuring head or sensing arm, which must be replaced specifically for a particular measuring task. Since such measuring heads or sensing arms are also often designed to be movable, the optical connection incorporated in the connecting device ensures that no parasitic forces such as those occurring, for example, due to optical coupling via separate optical waveguides, are transferred to the measuring head or the sensing arm. The beam guide incorporated into the connecting device is not accessible from the outside when mounted and is thus mechanically protected. The interaction of the magnetic forces and the centering means causes the optical systems to align at the time of the assembly and to hold a defined position, so that accurate mutual positioning of the optical systems is ensured for optimized beam transition.

In an example embodiment of the present invention, the magnetic coupling is formed by a magnetic system of at least one pair of magnets which are situated opposite each other when assembled, the magnets being designed as permanent magnets and/or as electromagnets, or the magnetic coupling being made up of at least one magnet and a material situated opposite thereto when assembled which may be magnetically attracted, the magnet being designed as a permanent magnet or an electromagnet.

Permanent magnets situated opposite one another establish a strong magnetic connection. By suitably selecting the polarity of the permanent magnets, a definite mutual alignment of the optical systems may be achieved when using more than one pair of magnets, for example, in rotationally symmetric connecting devices.

When using a combination of magnets and magnetically attractable materials, the housing or the connecting device area of the housing of one of the optical systems, for example, may be manufactured from such a magnetically attractable material. This makes providing and assembling separate magnets in the manufacture of one of the optical systems unnecessary.

By using electromagnets, the mechanical connection between the optical systems may be electrically opened and closed. In this way, no magnetic forces need to be overcome for separating the optical systems, which makes gentle replacement of sensitive optical systems possible.

If optically imaging components which generate a collimated or a focused beam are situated upstream and downstream from the beam transition, these allow low-loss transition of the radiation between the optical systems in the form of a free beam. Both a collimated beam and a focused beam are invariant with respect to a rotation of the optical systems about the optical axis.

Furthermore, within certain limits, a collimated beam is tolerant to mutual displacement of the optical systems transversely to the optical axis, which in general results only in some weakening of the light if the downstream optical component in the beam direction is no longer able to detect the entire cross section of the beam bundle. An interferometric measurement, for example, is not affected thereby.

A focused beam is tolerant to tilting in the area of the focal point. Both beam guides allow, within certain limits, a mutual deviation of the optical axes from the coupled optical systems, which is used for compensating mechanical tolerances of the connection and may also be used in a controlled manner if, for example, one of the optical systems must be moved relative to the other during a measurement or the beam in the second optical system must be guided in a direction different from that of the optical axis of the first optical system.

A mechanical rotation of one of the optical systems is made possible by designing the magnetic coupling so that it rotates about the optical axis of the beam guide. If the second optical system represents a measuring head having a lateral exit of the light toward a test object, for example, the position of the point of measurement may be modified by rotating the second optical system, for example, for scanning the internal surface of a cylindrical bore hole.

For this purpose, the plane of rotation may be situated in the area of the beam transition, because here the beam is guided as a free beam and, regardless of the selected mode of guiding the beam as a collimated or focused beam, it is invariant with respect to a rotation about the optical axis.

The beam transition may be situated either within the magnet system or laterally from the magnet system. Positioning the beam transition within the magnet allows a largely symmetrical design and correspondingly symmetrical force distribution, which results in a gap in the area of the beam transition between the optical systems that remains constant. The connection may be made very sturdy and reproducible. However, a plurality of magnet pairs or a circumferential ring magnet is needed. Lateral positioning allows the use of only one pair of magnets for the magnetic coupling. Compared to the location within the magnet, further degrees of freedom are obtained for positioning the optical transition, which may thus be positioned on the edge or in a corner of the connecting device.

In one example embodiment of the present invention, at least one of the optical systems is designed as an optical waveguide. Two optical waveguides having optically imaging components may be directly connected or a connection between one optical waveguide and a system designed as a free beam optical system may be established. Optical waveguides allow a beam to be supplied within an optical system, for example, directly from a radiation source or from an optical measuring system to a connecting device and subsequently to the appropriate optical components in the second optical system. The connecting point may thus be situated spatially separated from the particular optical measuring and analyzing systems.

The device may be used for coupling optical systems in which one optical system has a modulation interferometer and the other optical system has a measuring probe and/or reference probe which is optically coupled to the modulation interferometer. Such systems are often used in profile measuring machines for interferometric measurement of the profile or the distance of rough surfaces. In this case, measuring probes are used depending on the particular measuring task and the particular test object, which requires a change of the measuring probes. The connecting device according to the present invention makes a quick and automated change of the measuring probe possible, because only the magnetic connection must be detached. If the measurement is performed in an air-conditioned booth, compared to known systems having a separate optical connection of the measuring probe to the optical waveguides, the booth door only has to be opened briefly, or not at all, for replacing the measuring probe, which results in smaller temperature fluctuations. Using a rotatable mount, the measuring probe may be adjusted according to the measuring task. If further degrees of freedom are provided for moving the measuring probe, no parasitic forces are transferred to the measuring probe or a sensing arm containing the measuring probe by the connecting device, as is the case of an optical coupling of the measuring probe to the measuring machine using a freely running optical waveguide. In most cases, the replacement of the measuring probe also requires a replacement of the reference probe. The reference probe may also be connected using the connecting device according to the present invention, resulting in the advantages described for the measuring probe.

DETAILED DESCRIPTION

Figure 1:
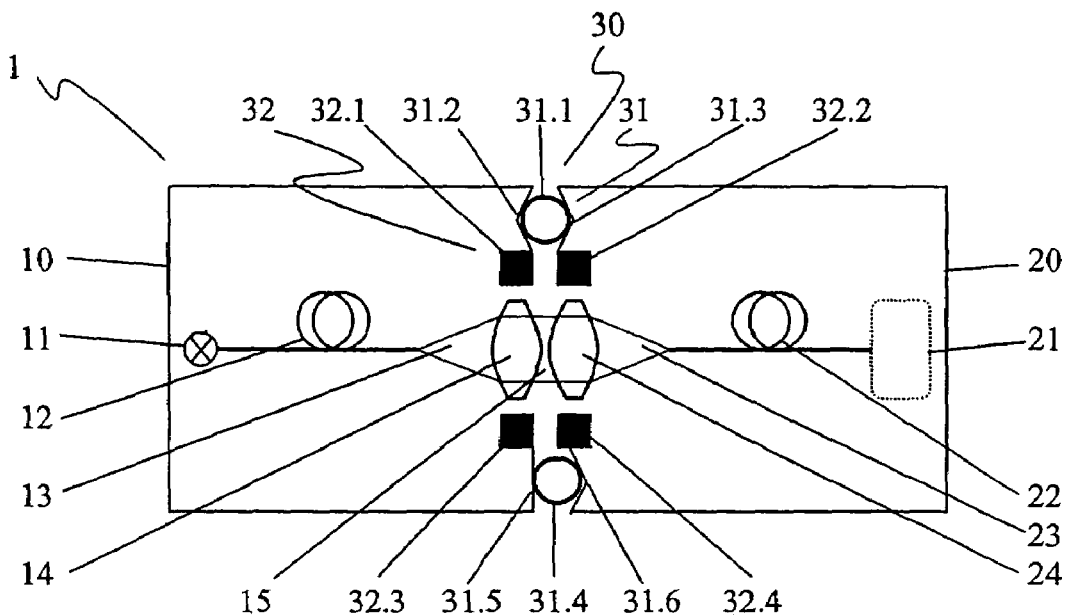
FIG. 1 shows a schematic illustration of a device for coupling optical beam guides having a collimated beam.

FIG. 1 schematically shows a device for coupling optical beam guides 1 having a collimated beam. A first optical system 10 contains a light source 11 and an optical waveguide 12, using which a beam 13 of light source 11 is supplied to an imaging component 14 in the form of an optical lens. A second optical system 20 contains an imaging component 24, also in the form of an optical lens, which is situated opposite the imaging component 14 of first optical system 10 along the optical axis, as well as a downstream optical waveguide 22 and a point of action 21 of the radiation. The radiation of light source 11 is transmitted via optical waveguide 12 to first imaging component 14, is collimated thereby in the area of a beam transition 15, focused by imaging component 24 onto the end of optical waveguide 22, and supplied thereby to point of action 21.

The mechanical connection between the two optical systems 10, 20 is achieved in the form of a connecting device 30, which includes a magnetic coupling 32 and a centering means 31. In this exemplary embodiment, magnetic coupling 32 is implemented by two magnets 32.1, 32.3 situated in first optical system 10 and two magnets 32.2, 32.4 situated in second optical system 20, pairs of magnets 32.1, 32.2 and 32.3, 32.4 being located opposite one another over a gap between the two optical systems 10, 20. Centering means 31 includes a plane 31.5, grooves 31.2, 31.3, 31.6, and centering bodies 31.1, 31.4 engaging in the grooves.

A magnetic coupling and thus a detachable mechanical connection between the two optical systems 10, 20 is achieved by the mutual attraction of magnets 32.1, 32.2, 32.3, 32.4. Centering means 31 cause optical systems 10, 20 to center mutually until optical components 14, 24 are positioned opposite one another, thus making a beam transition 15 between optical systems 10, 20 possible.

Using connecting device 30, both a mechanical and an optical connection are achieved between optical systems 10, 20 without any additional optical components to be attached such as optical waveguides running freely parallel to the connecting device. Replacement of one of optical systems 10, 20 is thus possible by detaching and re-attaching the magnetic coupling without any additional assembly steps, which makes automatic replacement of one of optical systems 10, 20 possible in the first place.

The collimated beam provides a displacement-invariant beam transition 15. An offset of optical systems 10, 20 transversely to the optical axis of beam transition 15, as may be caused by mechanical tolerances of centering means 31 or by an intentional movement of optical systems 10, 20 relative one another, results in weakening of the beam, but has no further effect on interferometric measurements, for example. Neither does a relative rotation of optical systems 10, 20 about the optical axis have any effect on the transition of the radiation between optical systems 10, 20 and thus on the optical measurement.

In the exemplary embodiment, beam transition 15 takes place centrally in the magnet system. However, asymmetric designs in which beam transition 15 is situated laterally from magnets 32.1, 32.2, 32.3, 32.4 are also possible. The number of magnets 32.1, 32.2, 32.3, 32.4 used may differ from the illustrated embodiment. Permanent magnets or electromagnets may be used, the latter with the advantage that the magnetic connection may be opened and closed by switching the corresponding electrical circuit. Combinations of magnets and magnetically attractable materials are also possible. Thus, for example, the housing of one of optical systems 10, 20 may be manufactured of a magnetically attractable material, so that appropriate magnets 32.1, 32.2, 32.3, 32.4 must only be provided in optical system 10, 20 situated opposite them.

In this exemplary embodiment, centering means 31 includes engaging spheres 31.1, 31.4, grooves 31.2, 31.3, 31.6, and plane 31.5. A plurality of alternative designs are possible for this purpose which, combined with the magnetic forces, result in a statically defined system and are generally used in mounting devices. Examples include indentations, cylinders, cones, and the like. The important thing is that the attracting forces of magnets 32.1, 32.2, 32.3, 32.4 cause optical systems 10, 20 to self-center relative to one another via centering means 31.

Figure 2:
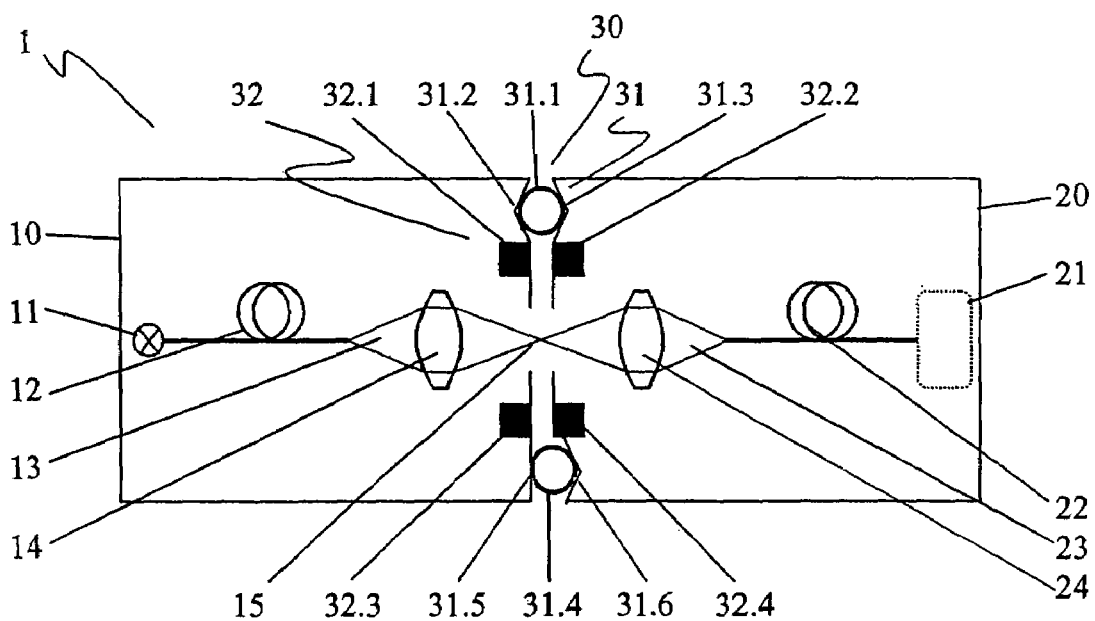
FIG. 2 shows a schematic illustration of a device for coupling optical beam guides having a focused beam.

FIG. 2 schematically shows a device for coupling optical beam guides 1 having a focused beam. The illustrated components correspond to those already described in connection with FIG. 1. In contrast to FIG. 1, imaging components 14, 24, designed as lenses, produce a beam focused in beam transition 15. Such a beam transition 15 is invariant with respect to a rotation of optical systems 10, 20 about the optical axis and, within certain limits, with respect to relative tilting of the optical systems at the focal point.

Figure 3:
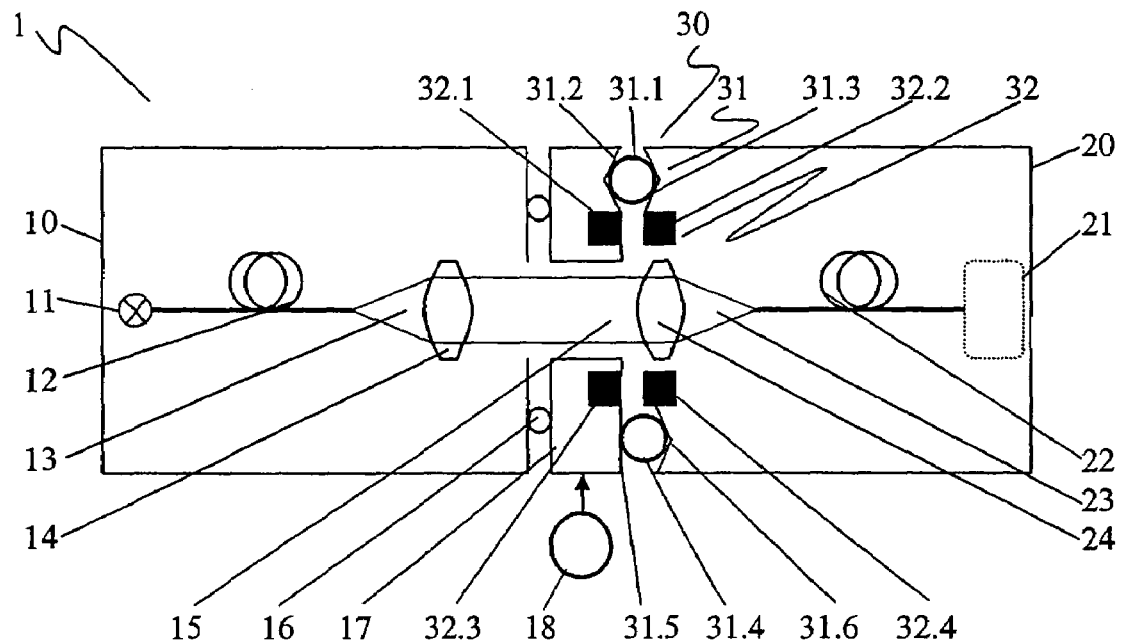
FIG. 3 shows a schematic illustration of a rotatably mounted device for coupling optical beam guides.

FIG. 3 schematically shows a rotatably mounted device for coupling optical beam guides in an extension of the variant illustrated in FIG. 1. In addition to the components described in FIG. 1, a rotatable mount 17 is associated with first optical system 10 in the area of beam transition 15 via a rotary bearing 16. Driven by a motor 18, rotatable mount 17 is able to rotate about the optical axis of beam transition 15. The components, magnets 32.1, 32.3 of magnetic coupling 32, plane 31.5, and groove 31.2 of centering means 31, associated with optical system 10 and whose functions have already been described, are situated on rotatable mount 17 opposite second optical system 20 and thus enable the magnetic coupling between optical systems 10, 20 as described above. The plane of rotation is in the area of beam transition 15 designed as a collimated free beam. Therefore, a relative rotation about the optical axis has no effect on the transition of the radiation between optical systems 10, 20. Alternatively, a focused beam transition 15 such as illustrated in FIG. 2 is also possible.

Figure 4:
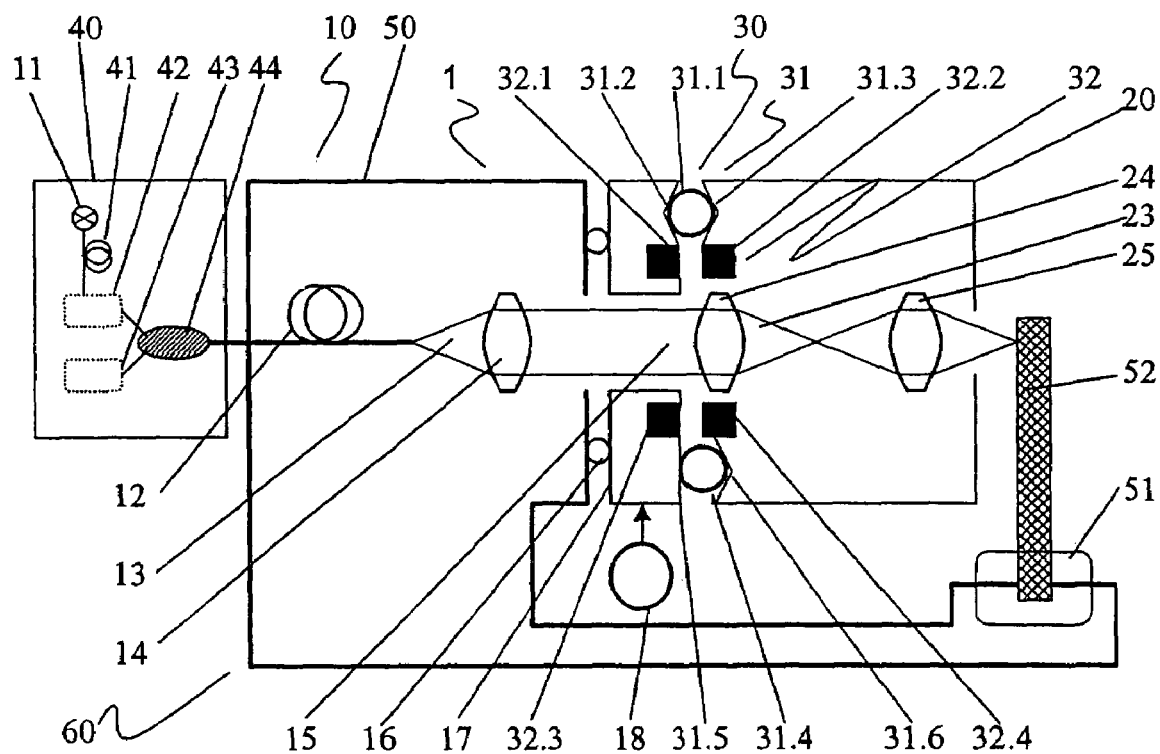
FIG. 4 shows a schematic illustration of a rotatably mounted device for coupling optical beam guides in a profile measuring machine.

FIG. 4 schematically shows a rotatable device for coupling optical beam guides 1 to a profile measuring machine 60. First optical system 10 has a measuring machine 50 and an attached optical measuring unit 40. Optical measuring unit 40 contains an interferometric measuring device having light source 11, which is optically coupled to a modulation interferometer 42 via an optical waveguide 41, an attached optical waveguide coupler 44, and a receiver 43. Optical waveguide 12 guides the radiation of light source 11 from optical waveguide coupler 44 of optical measuring unit 40 to imaging component 14 situated in measuring machine 50. Imaging component 14 collimates optical beam 13 exiting from optical waveguide 12 in the area of beam transition 15 to second optical system 20 in the form of an optical sensing arm. In the rotatable design of connecting device 30, described previously in FIG. 3, the optical sensing arm is mechanically coupled to measuring machine 50 via magnetic coupling 32 and centering means 31. The radiation is relayed in second optical system 20, designed as a free-beam optical system, using two imaging components 24, 25, which focus the beam onto the surface of a test object 52. Test object 52 is held above a rotating mount 51 connected to measuring machine 50. The radiation reflected from test object 52 is supplied, in the opposite direction relative to the incident radiation, to optical waveguide coupler 44 via imaging components 25, 24, 14 and optical waveguide 12, and from there to receiver 43.

Profile measuring machine 60 enables the interferometric measurement of the surface of test object 52. At connecting device 30, second optical system 20, designed as a sensing arm, may be easily separated from measuring machine 50 by overcoming the magnetic attraction forces when using permanent magnets or by switching them off when using electromagnets. Separation of the mechanical coupling immediately also results in the separation of the optical coupling of optical systems 10, 20. No additional connections need to be separated as necessary, for example, in the case of an optical coupling of the sensing arm to measuring machine 50, i.e., to optical measuring unit 40 via a parallel and freely suspended optical waveguide. This makes automated replacement of the sensing arm possible which may be necessary for changed measuring tasks. Furthermore, no interference of the interferometric measurement occurs as may occur in the case of a freely guided optical waveguide for optical connection of the sensing arm due to parasitic mechanical forces or to deformation or vibration of the optical waveguide.

What is claimed is:

1. A device for coupling beam guides of oppositely-positioned optical systems for transmission of beams via a beam transition between the optical systems, comprising:

a connecting device; and a mechanical centering arrangement;

wherein the connecting device includes a magnetic coupling arrangement in a coupling area for producing a coupling connection, and wherein the mechanical centering arrangement includes components situated on the opposite optical systems and coupled in such a way that mechanical centering arrangement, in conjunction with magnetic force of the magnetic coupling arrangement, causes the beam guides to self-center;

wherein the magnetic coupling arrangement includes one of: a) at least two electromagnets which are situated opposite each other and forming a pair; and b) at least one electromagnet and one magnetically attractable material situated opposite to the at least one electromagnet; and wherein the components of the mechanical centering arrangement include a plurality of v-shaped grooves, a planar surface and a plurality of centering bodies; each centering body engaging with one of: a) two oppositely oriented v-shaped grooves, and b) the planar surface and a v-shaped groove oriented oppositely to the planar surface, and at least one centering body engaging with the planar surface and the v-shaped groove oriented oppositely to the planar surface.

2. The device as recited in claim 1, wherein optical imaging components which generate one of a collimated beam and a focused beam in the beam transition are situated upstream and downstream from the beam transition.

3. The device as recited in claim 2, wherein the magnetic coupling arrangement is rotatable about the optical axis of the beam guide.

4. The device as recited in claim 3, wherein a plane of rotation of the magnetic coupling arrangement is situated in the area of the beam transition.

5. The device as recited in claim 1, wherein the beam transition is situated one of directly within the area of the coupling arrangement and laterally displaced from the coupling arrangement.

6. The device as recited in claim 3, wherein the beam transition is situated one of directly within the area of the coupling arrangement and laterally displaced from the coupling arrangement.

7. The device as recited in claim 1, wherein at least one of the optical systems is an optical waveguide.

8. The device as recited in claim 3, wherein at least one of the optical systems is an optical waveguide.

9. A method for coupling beam guides of oppositely-positioned optical systems for transmission of beams via a beam transition between the optical systems, comprising:

providing a device including a connecting device and a mechanical centering arrangement, wherein the connecting device includes a magnetic coupling arrangement in a coupling area producing a coupling connection, the magnetic coupling arrangement including one of: a) at least two electromagnets which are situated opposite each other and forming a pair; and b) at least one electromagnet and one magnetically attractable material situated opposite to the at least one electromagnet, wherein the mechanical centering arrangement includes components situated on the opposite optical systems and being coupled in such a way that mechanical centering arrangement, in conjunction with magnetic force of the magnetic coupling arrangement, causes the beam guides to self-center, and wherein the components of the mechanical centering arrangement include a plurality of v-shaped grooves, a planar surface and a plurality of centering bodies; each centering body engaging with one of: a) two oppositely oriented v-shaped grooves, and b) the planar surface and a v-shaped groove oriented oppositely to the planar surface, and at least one centering body engaging with the planar surface and the v-shaped groove oriented oppositely to the planar surface;

wherein a first optical system is provided with a modulation interferometer and a second optical system is provided with at least one of a measuring probe and a reference probe optically coupled to the modulation interferometer.

* * * * *